April 14, 1931.  E. W. SMITH  1,800,364

STORAGE BATTERY

Original Filed Jan. 30, 1922

INVENTOR

Edward W. Smith

BY Augustus B. Stoughton

ATTORNEY.

WITNESS:

Patented Apr. 14, 1931

1,800,364

UNITED STATES PATENT OFFICE

EDWARD W. SMITH, OF PHILADELPHIA, PENNSYLVANIA

STORAGE BATTERY

Application filed January 30, 1922, Serial No. 532,726. Renewed October 23, 1928.

This invention has for one of its objects the improvement of the separators used between the plates of storage batteries, for the purpose of insulation. Such separators are commonly made of thin, wooden boards grooved on one side, or of perforated sheets of hard rubber, frequently both kinds being used together.

Both wood and hard rubber, however, are subject to chemical action in a storage battery, especially where in contact with lead peroxide, which constitutes the active material of the positive pole plate in the ordinary lead storage cell, and this invention has for its further object the protection of the separators from this action of the peroxide, as well as the better retention of the peroxide in place in the supporting grids.

Figure 1:
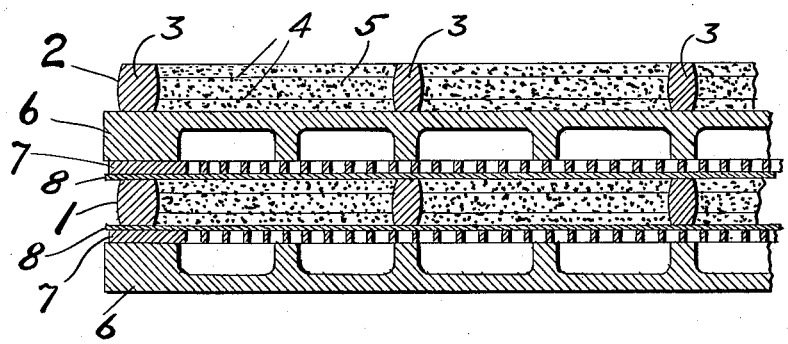
Figure 2:
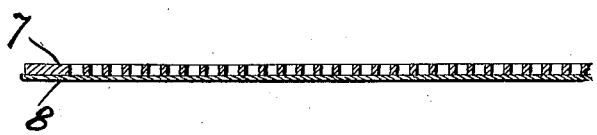
Figure 3:
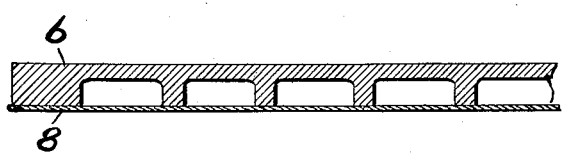

Reference to the drawings will make clearer the principle of the invention and in the drawings Figure 1 is a horizontal section through a pair of plates showing separators embodying features of the invention, and Figs. 2 and 3 are similar views showing separators embodying a modification of the invention.

Referring more particularly to Figure 1, 1 is the positive pole plate and 2 the negative pole plate, each shown as consisting of a metallic frame 3 with connecting bars 4 imbedded in the active material 5. 6 is a grooved wood separator and 7 is a perforated rubber separator such as are frequently used in combination.

Under these conditions, however, deterioration of the hard rubber 7 takes place to a marked degree, and further the active material 5 of the positive plate 1 gradually softens and percolates through the perforations, even when these are in the form of very narrow slots.

To prevent both of these actions, the imperforate inert, finely porous layer 8 is placed between the surface of the positive pole plate, or positive surface, and the separator or retainer, as shown. This layer may consist of asbestos paper, or material of like characteristics, asbestos being practically inert under the conditions indicated.

The operation of the applicant's combined separator during the useful life of the battery is as follows:

The asbestos sheet is highly porous permitting free diffusion of the electrolyte to all parts of the positive plate but at the same time acting as a retainer for the active material and retarding its dislodgment. The wooden separator is less porous than the asbestos sheet but is readily oxidized when in contact with the positive plate. This non-porous characteristic is taken advantage of to prevent particles of active material from the positive plate sifting or filtering through the separator and bridging across to the negative plate. These particles will, in time, penetrate through the asbestos sheet from the positive plate and would then commence to oxidize the wooden separator were it not for the rubber sheet interposed between the two. This further retards the passage of the particles, and, being less subject to oxidation than the wood, greatly prolongs the life of the separator and hence the useful life of the battery.

The construction and mode of operation of the modifications shown in Figs. 2 and 3 are substantially as above described except that Fig. 3 shows a grooved wood separator 6 having the protective layer 8 adherent to its face, while Fig. 2 shows a perforated rubber sheet 7 with a similar protective adherent layer 8.

I claim:

1. A storage battery separator having a layer of inert, finely porous material adherent thereto.

2. A storage battery separator consisting of a sheet of perforated hard rubber having a layer of finely porous, inert material adherent thereto.

3. A separator consisting of a sheet of perforated rubber having a finely porous layer of asbestos adherent thereto.

4. In a storage battery the combination of positive and negative pole plates with a layer of asbestos disposed adjacent to the surface of the positive pole plate, a wood diaphragm grooved on one side and smooth on the other side and arranged with its smooth side lying against the surface of the negative pole plate, and a perforated hard rubber sheet located between the layer of asbestos and the grooved side of the wood separator.

5. In a storage battery the combination of positive and negative pole plates with a sheet of fibrous material inert to the oxidizing action of and disposed adjacent to the surface of the positive pole plate, a wood diaphragm grooved on one side and smooth on the other side and arranged with its smooth side lying against the surface of the negative pole plate, and a perforated hard rubber sheet located between the sheet of fibrous material and the grooved side of the wood diaphragm.

EDWARD W. SMITH.